June 9, 1953    C. E. SCHMIDT    2,641,061
HYDROSTATIC LEVEL
Filed Jan. 8, 1951    2 Sheets-Sheet 2
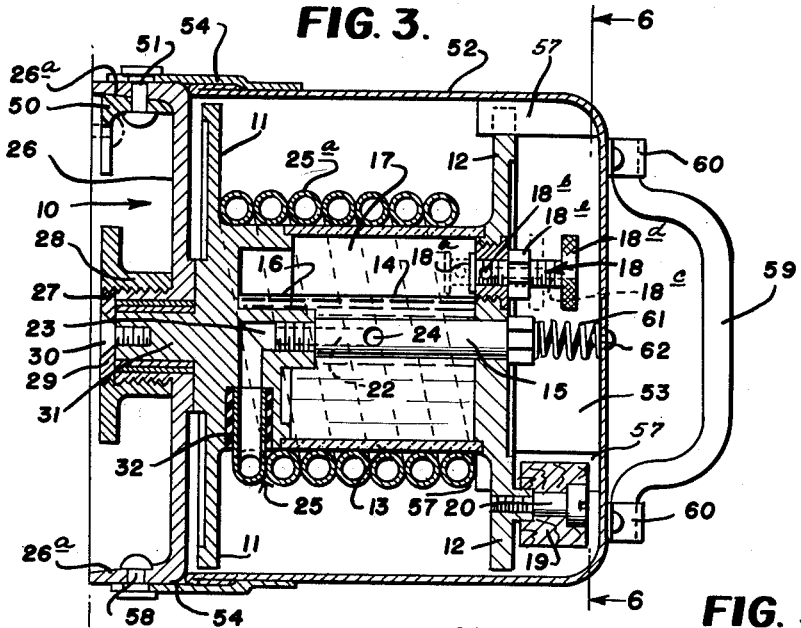
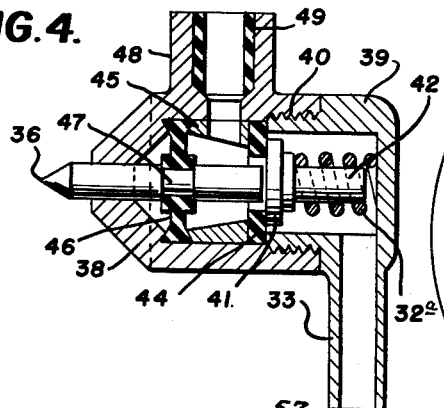
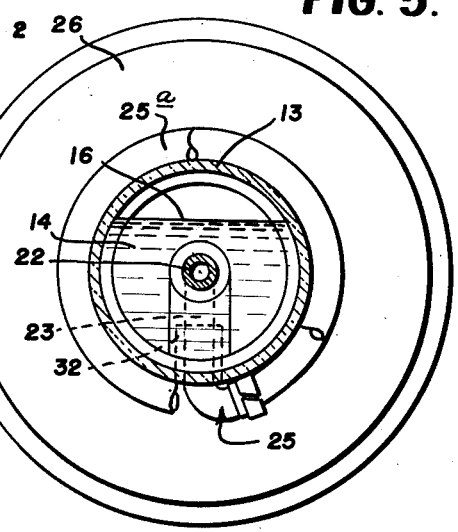
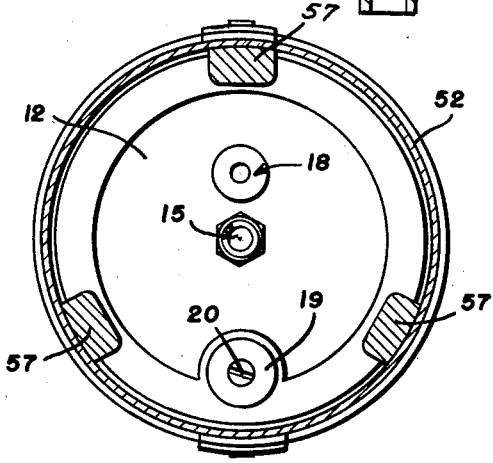
INVENTOR
CHARLES E. SCHMIDT
BY Wilkinson & Mawhinney
ATTORNEYS

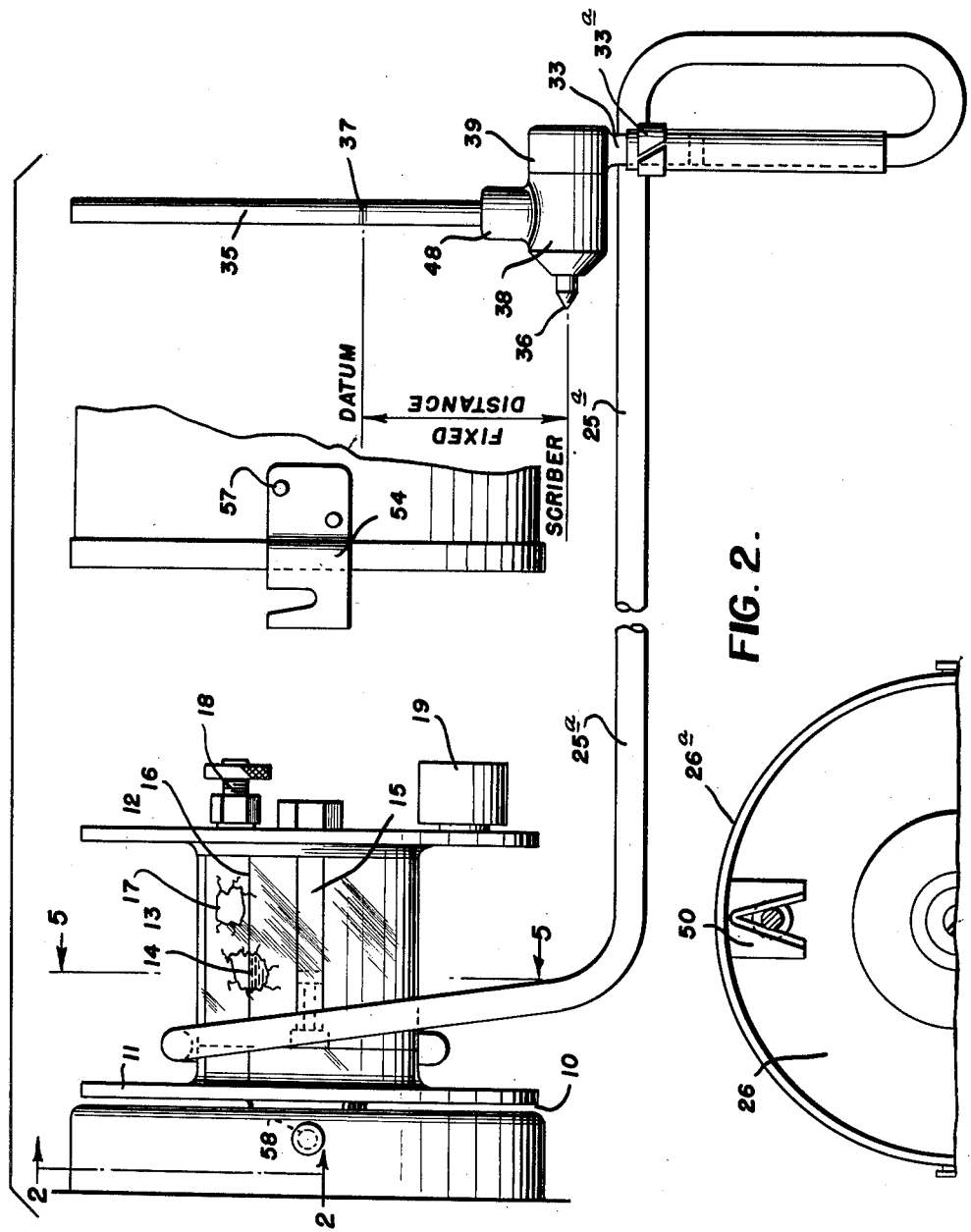

Patented June 9, 1953

2,641,061

UNITED STATES PATENT OFFICE 2,641,061

HYDROSTATIC LEVEL

Charles E. Schmidt, Ocean Springs, Miss.

Application January 8, 1951, Serial No. 205,012

12 Claims. (Cl. 33—209)

The present invention relates to improvements in a hydrostatic level and is an improvement over my prior Patent No. 2,558,004, granted June 26, 1951. The primary object of this invention is to provide a device of this character which makes use of the principle that a liquid will rise to the level of its source, and can be employed for establishing an absolute level line or plane of levels independent of delicate parts and sensitive adjustments.

Another object of the present invention is to provide an improved level for operation in a range intermediate to that of the telescopic level and the hand level, being more economical than the former and faster and more accurate than the latter. Its operation by one man adds further to the economy and accuracy.

A further object of the present invention is to provide an improved structure in which the reservoir for the supply of liquid also serves as a reel upon which the flexible tube can be wound when the level is not in use, the cylindrical wall of the reservoir being of a transparent material, and the top flange being suitably designed for stowing the scriber valve and level sight.

A still further object of the present invention is to provide an improved device of this character in which an air space is formed above the liquid in the reservoir, and the hydrostatic connection with the reservoir is made through a passage extending from one side of the reel and terminating at the geometric center of the reservoir. With this arrangement the terminus of the hydrostatic connection cannot emerge into the air space regardless of the position of the reel. If in unreeling or otherwise handling such levels, the hydrostatic connection emerged into the air space, liquid would spill from the tube thus creating an air void which is fatal to the accuracy of a hydrostatic level.

A still further object of the present invention is to produce a device of this character wherein the level sight, which is connected with the hydrostatic connection communicating with the reservoir, is carried by a valve which valve performs the function not only of a valve but of a scribe actuated valve having the scribe integral with the valve stem so that when the scribe is applied to the surface to be marked the valve will permit the liquid in the hydrostatic connection to rise in the level sight to be matched with a datum mark circumscribed on the level sight, which datum mark has a fixed relation to the scribe point for all level operations, thereby eliminating possible error in transferring level mark from level sight to work.

A still further object of the present invention is to provide a device of the character described wherein the reel for carrying the hydrostatic tube is rotatably journalled in a support equipped with a hanger suitable for affixing the device to a partially driven nail, and also equipped with a handle for holding the level during reeling operation. This handle is attached to the hub by means of a standard pipe thread, which can also be used for other attachments made of standard pipe fittings.

A still further object of the present invention is to provide a device of this character which is of a compact efficient construction, positive in use and permitting of economical manufacture.

With the foregoing and other objects in view, the invention will be more fully described hereinafter, and will be more particularly pointed out in claims appended hereto.

In the drawings, wherein the symbols refer to like or corresponding parts throughout the several views, Figure 1 is a side elevational view with parts broken away showing the improved hydrostatic level consisting of its reel and reservoir and scribe actuated level sight constructed in accordance with the present invention.

Figure 2 is a fragmentary vertical longitudinal section taken on the line 2—2 in Figure 1.

Figure 3 is a vertical transverse section taken through the reel, reservoir and support with carrying cover in place having parts broken away and part shown in section.

Figure 4 is a vertical longitudinal section taken through the level sight scribe actuated valve support.

Figure 5 is a vertical longitudinal section taken on the line 5—5 in Figure 1, and Figure 6 is a vertical longitudinal section taken on the line 6—6 in Figure 3.

Referring more particularly to Figures 1 and 3 of the drawings 10 generally designates a combined reel and reservoir comprising a pair of spaced apart heads 11 and 12 which may be of cast aluminum, plastic or other suitable material having a drum 13 disposed between the heads. While the drum 13 may be of any suitable material, it is desired that it be of transparent material such as plastic or glass so as to render visible the contained fluid 14. The heads 11 and 12 may be formed integral with the drum 13 or may be formed separate and held in assembly by a bolt 15.

The drum 13 is filled with the liquid 14 to a height indicated at 16 to provide an air space 17 between the liquid level 16 and the inner surface of the adjacent portions of the wall of the drum 13. The air space 17 communicates with the outside atmosphere through a vent valve 18 which must be of that type having the valve seat at its extremity, or in this application, having its valve seat approximately at the inner surface of the head or flange 12 so that when the valve is closed no liquid can enter into any part or passage of the valve.

One form of such vent valve is shown in the drawings as having a closed inner end 18a with a lateral port 18b opening through the periphery of the valve 18, such valve being in the form of a screw bolt having a threaded opening in the end head 12. The inner end of the port 18b communicates with an axial bore 18c in the valve bolt 18, such bolt opening to atmosphere at the extremity of the head 12. A knurled head 18d on the extreme end of the valve screw bolt 18 facilitates the rotation of the bolt 18 from the solid line position of Figure 3 to the dotted line position. In such solid line position the port 18b is masked in the wall of the drum head 12, while in the inner dotted position the port 18b opens to the internal air space of the reservoir. A lock nut 18e threaded on the bolt 18 provides for binding the valve in adjusted position.

For turning the reel, a knob 19 is attached to the head 12 by means of a screw 20.

The combination reel and reservoir consisting of heads 11 and 12 and transparent drum 13, is held in assembly by bolt 15 which is provided with a bore 22 partially therethrough. One end of the bore 22 communicates with a passage 23 and the other end of the bore communicates with the liquid 14 in the drum 13 as by an opening 24. This opening 24 is situated in the geometric center of the drum or reservoir in order that the same be continuously immersed in the liquid 14 for any horizontal or vertical position of the reel and reservoir. This is to avoid the entrapment of air in the hydrostatic line thereby giving a false reading. The outer end of passage 23 removably receives a substantially L-shaped connector 25 inserted in a passage in the head 11 and held there by friction of a rubber insert 32 in the passage, and by this passage communicates with the bore in bolt 15. The reel is rotatably carried on a base 26 by bushed bearing 27, the outer surface of which is threaded to receive handle 28. Bearing 27 receives sleeved journal 31 which is held in position by retainer 29 and screw 30, and which is coaxial with assembly bolt 15 and defines therewith the axis of rotation of the reel about the base 26. The base may be in the form of a substantially circular type like member having upstanding flanges 26a therefrom, which as seen in Figures 1 and 3 are directed away from the reel.

The tube 25a is of a transparent flexible material, and is clamped at one end to connector 25 and at the other end is attached a scriber valve by means of a reinforcing tube of the same material, which in turn is clamped to a valve boss 33 by means of a clamp 33a. In practice this tube may have an inside diameter of $\frac{3}{16}$ or $\frac{1}{4}$ inch long, however these dimensions are not necessarily so limited.

The principal function of the scriber valve is to control the flow of liquid in a level sight 35 and to inscribe the level mark by means of a scriber 36 when liquid comes to rest at a datum mark 37. The valve body is in two parts 38 and 39 attached by screw threads 40 as best seen in Figure 4. The scriber valve is provided with a valve stem which is also the scriber, in other words, the act of scribing a mark also opens the valve. The scriber 36 is of hardened and non-corrosible steel; it pushes against a valve 41 which has an axial extension 42 for the purpose of providing an abutment or stop for limiting axial movement of the scriber through the valve. A spring 32a returns the valve 41 to its seated or closed position against a valve seat 44. The valve seat 44 is held in position against a cylindrical part 45 when the valve body 39 is screwed into the valve body 38. These valve body parts may be of plastic and transparent so as to render visible the fluid or liquid. A diaphragm 46 is provided for packing the valve, or preventing the loss of liquid between the valve stem and body. It is of a soft material such as rubber and is squeezed on to the stem 36 at an undercut portion 47 and is clamped in position by cylindrical part 45 and valve body 38. The flexibility of diaphragm 46 permits the relatively small movement of stem 36, while the undercut portion 47 prevents any relative motion between stem and packing or diaphragm 46.

Valve body 38 has a boss 48 with a rubber insert 49 for receiving by friction the level sight 35 which is a rigid transparent tube having an inside diameter approximately equal to that of the flexible tube, and the length of which is approximately equal to the diameter of the head 12. The datum marking 37 is inscribed on the outside surface of the tube approximately 1½ inches from the lower end thereof. This is for the purpose of matching the liquid level and thus bringing the scriber point to a fixed relation thereto.

The threaded boss 27 is provided with a standard pipe thread, which will facilitate making various attachments for the purpose of supporting the leveling device for special uses. For instance, by removing the handle 28 and substituting a pipe coupling and short length of pipe the level can be conveniently supported by sticking the pipe into the ground.

The level can be operated by placing it on any convenient surface with the reel axis vertical. It can also be operated horizontally by hanging the device on a nail, making use of a hanger 50 which is permanently riveted at 51 to the base 26.

When the leveling operation is completed the tube 25a is reeled upon the drum in level rows and layers finishing near the head 12. A few inches of the tube end having the scriber valve attached for passing through one of the openings 57 and with the level sight 35 removed from the valve boss 48, both sight and valve are placed on the head 12 and a cover 52 is placed thereover. Referring more particularly to Figure 3, a space 53 is provided for the stowage of the scriber valve and level sight.

The clamps 54 attached to cover 52 by resistance welding engage posts 58 for retaining the cover 52 in place upon rotary motion of the cover. In addition to inclined slots in clamps 54 a tightening action is also provided by spring 61, attached by rivets 62 and bearing on the head of bolt 15. A handle 59 is attached to the cover by straps 60 and provides a convenient means of handling the level.

In the use of the device, assuming that it is in the storage position, that is reeled up and covered, the cover is rotated counterclockwise and removed, and set aside. The level is hung at some convenient height on a nail or similar fastening by means of the V-slot in hanger 50, or the level is simply placed on its base with reel axis vertical, on some convenient surface, the tube 25 being then unreeled to the desired point. Level sight 35 is inserted in scriber valve boss 48. If the level is hung horizontally, vent valve 18 must be placed in an "up" position, that is, above liquid level, and then opened. If level is placed vertically, the vent valve 18 will be up. With vent valve 18 opened, point 36 of scriber valve is pressed against stake or other surface on which level mark is to be inscribed. If liquid rises rapidly to top of the level sight 35 the scriber valve is then moved to a higher position. If liquid does not rise in sight 35, the valve is lowered until the liquid appears. When datum line 37 is matched with liquid surface the desired level mark is scribed by a side motion of the scriber valve. This operation is repeated at other stations without disturbing the original setting of the level.

When all marks are inscribed, drop liquid below scriber valve by opening in a higher position, then reel in tube closely and evenly. When tube 25a is completely reeled in, the end of tube 25a is placed with the scriber valve on head 12. Level sight 25 is removed from the valve and placed in the same position. The cover 52 is replaced and turned clockwise to engage the clamps 54.

Since the operation of the hydrostatic level is based on the corollary that a liquid will rise to the level of its source, it is important that two precautions be taken; there must be sufficient liquid in the reservoir to cover the connection, and the liquid in the tube must have no air voids. It is for this reason that this hydro-level makes use of transparent plastic both for the reservoir and the tube; any lack of liquid in the reservoir or presence of air in the tube is immediately apparent, particularly when the liquid is brightly colored.

What I claim is:

1. An improved hydrostatic level comprising a liquid reservoir, a hydrostatic tube having one end communicating with the liquid in said reservoir, a distant level reading sight, a normally closed valve between said sight and the other end of the tube, and a scriber connected to said valve in such relation to open the valve when applied to scribe a mark.

2. An improved hydrostatic level comprising a liquid reservoir, a hydrostatic tube having one end arranged to receive liquid from said reservoir, a liquid sight tube in communication with the other end of said hydrostatic tube, a valve casing interposed between said sight tube and said other end of the hydrostatic tube, a valve in said casing, means for biasing said valve yieldably to a closed position, and a scriber connected to said valve and having a portion projecting beyond the casing for impingement against an object in the act of making a marking and at the same time opening said valve.

3. An improved hydrostatic level comprising a liquid reservoir, a hydrostatic tube having one end arranged to receive liquid from said reservoir, a liquid sight tube in communication with the other end of said hydrostatic tube, a valve casing interposed between said sight tube and said other end of the hydrostatic tube, a valve in said casing, means for biasing said valve yieldably to a closed position, a scriber connected to said valve and having a portion projecting beyond the casing for impingement against an object in the act of making a marking and at the same time opening said valve, and means for limiting the opening movement of said valve.

4. An improved hydrostatic level comprising a liquid reservoir, a hydrostatic tube having one end arranged to receive liquid from said reservoir, a liquid sight tube in communication with the other end of said hydrostatic tube, a valve casing interposed between said sight tube and said other end of the hydrostatic tube, a valve in said casing, means for biasing said valve yieldably to a closed position, a scriber connected to said valve and having a portion projecting beyond the casing for impingement against an object in the act of making a marking and at the same time opening said valve, and a valve stem slidable through said casing and having a scriber at its outer free end spaced from the adjacent portion of said casing to permit inward movement of said valve stem due to axial pressure thereon incident to making a marking by said scriber resulting in the opening of said valve.

5. An improved hydrostatic level as claimed in claim 4 further comprising a flexible diaphragm mounted tightly in said casing at its outer edge and connected in a liquidtight manner to said valve stem at an intermediate portion.

6. An improved hydrostatic level as claimed in claim 4 further comprising a resilient diaphragm having an opening through its central portion binding in liquidtight manner about said valve stem and having its outer edge engaging in liquidtight manner against the adjacent wall of said casing, and means for locking the outer peripheral edge portion of said diaphragm to the outer adjacent wall portion of said casing.

7. An improved hydrostatic level as claimed in claim 6 in which said last named means comprises complementary dove-tail formations between said valve casing and the outer portion of said diaphragm, and means to urge the outer portion of said diaphragm into said dove-tail interlocking engagement.

8. An improved hydrostatic level comprising a liquid reservoir, a hydrostatic tube having one end arranged to receive liquid from said reservoir, a liquid sight tube, a valve casing having nipples to receive said hydrostatic and sight tubes, said nipples communicating with remote portions of said casing, a valve seat in an intermediate portion of said casing between said nipple connections, a valve on the hydrostatic tube side of said valve seat, means for yieldably biasing said valve to a closed position against said seat, and a valve stem projecting from the valve slidably through the casing and having its outer end shaped to provide a scriber.

9. An improved hydrostatic level as claimed in claim 8 characterized by the fact that both of said tubes, said reservoir and said valve casing are all of transparent material.

10. An improved hydrostatic level as claimed in claim 8 characterized by the fact that said casing is made in two parts with a nipple on each part and with the division between the parts occurring substantially at said valve seat.

11. An improved hydrostatic level as claimed in claim 8 characterized by the fact that said valve casing is in two parts threadedly connected together and having a shoulder against which said valve seat is adapted to abut, a resilient diaphragm resiliently bound at its intermediate portion to said valve stem and spaced from said valve seat, a spacer ring between said valve seat and diaphragm.

12. An improved hydrostatic level comprising a liquid reservoir, a flexible hydrostatic tube having one end communicating with the liquid in said reservoir, a manually supported valve body in communication with the other end of said hydrostatic tube, a liquid sight tube supported on said valve body, a scriber fixed to said valve body, a valve within the valve body for controlling the flow of liquid between the hydrostatic tube and the sight tube, and a circumferential datum on said sight tube, the relationship between said scriber and circumferential datum being a fixed constant.

CHARLES E. SCHMIDT.

References Cited in the file of this patent

UNITED STATES PATENTS

| Number | Name | Date |
|---|---|---|
| 277,037 | Le Grande | May 8, 1883 |
| 1,566,174 | Tyler | Dec. 15, 1925 |
| 2,158,102 | Betzold et al. | May 16, 1939 |
| 2,218,871 | Borden | Oct. 22, 1940 |
| 2,384,977 | Smearingen | Sept. 18, 1945 |
| 2,532,883 | Bennett | Dec. 5, 1950 |
| 2,558,004 | Schmidt | June 26, 1951 |
| 2,587,998 | Heath | Mar. 4, 1952 |

FOREIGN PATENTS

| Number | Country | Date |
|---|---|---|
| 338,880 | France | 1903 |